(12) United States Patent
Yu et al.

(10) Patent No.: US 10,256,063 B2
(45) Date of Patent: Apr. 9, 2019

(54) CONTROLLER AND CONTROL METHOD FOR ALTERNATING CURRENT CONTACTOR

(71) Applicants: SEARI ELECTRIC TECHNOLOGY CO., LTD., Shanghai (CN);
ZHEJIANG CHINT ELECTRICS CO., LTD., Yueqing (CN)

(72) Inventors: Fei Yu, Shanghai (CN); Changxun Gu, Shanghai (CN); Shunfeng Ge, Shanghai (CN); Di Zhang, Shanghai (CN); Yugang Feng, Shanghai (CN); Yawen Shi, Shanghai (CN); Ping Zeng, Shanghai (CN)

(73) Assignees: SEARI ELECTRIC TECHNOLOGY CO., LTD., Shanghai (CN);
ZHEJIANG CHINT ELECTRICS CO., LTD., Yueqing (CN)

( * ) Notice: Subject to any disclaimer, the term of this patent is extended or adjusted under 35 U.S.C. 154(b) by 312 days.

(21) Appl. No.: 15/329,210

(22) PCT Filed: Jul. 23, 2015

(86) PCT No.: PCT/CN2015/084895
§ 371 (c)(1),
(2) Date: Jan. 25, 2017

(87) PCT Pub. No.: WO2016/015590
PCT Pub. Date: Feb. 4, 2016

(65) Prior Publication Data
US 2017/0213677 A1 Jul. 27, 2017

(30) Foreign Application Priority Data
Jul. 30, 2014 (CN) .......................... 2014 1 0370008

(51) Int. Cl.
*H01H 47/32* (2006.01)
*H01H 47/02* (2006.01)
(Continued)

(52) U.S. Cl.
CPC .......... *H01H 47/02* (2013.01); *H01H 47/223* (2013.01); *H01H 47/325* (2013.01);
(Continued)

(58) Field of Classification Search
USPC ......................................... 361/139, 160, 194
See application file for complete search history.

(56) References Cited

U.S. PATENT DOCUMENTS

| 5,406,440 A * | 4/1995 | Wieloch | H01H 47/325 |
|---|---|---|---|
| | | | 327/385 |
| 2004/0207377 A1 | 10/2004 | Shimada et al. | |
| 2013/0021713 A1 * | 1/2013 | Choi | H01H 47/325 |
| | | | 361/160 |

FOREIGN PATENT DOCUMENTS

| CN | 101261908 A | 9/2008 |
|---|---|---|
| CN | 201156501 Y | 11/2008 |

(Continued)

OTHER PUBLICATIONS

Extended European Search Report issued in corresponding European Application No. 15827157.7 dated Mar. 5, 2018 (12 pages).
(Continued)

*Primary Examiner* — Danny Nguyen
(74) *Attorney, Agent, or Firm* — Osha Liang LLP

(57) ABSTRACT

A controller for an alternating current contactor includes: a filtering and rectification circuit that filters and rectifies external alternating current; an electromagnet component driven by an output of the filtering and rectification circuit that performs actions of attraction, holding or releasing; a power transistor circuit connected to the electromagnet
(Continued)

component; and a microcontroller that controls the power transistor circuit to control the actions performed by the electromagnet component. The controller further includes a voltage control loop that provides a voltage feedback signal and a current control loop that provides a current feedback signal to the microcontroller. The microcontroller generates a control signal according to the voltage feedback signal. The control signal is a PWM control signal having different duty cycles during the attraction and holding of the electromagnet component so that the current does not exceed a predetermined current threshold during the attraction and bolding of the electromagnet component.

10 Claims, 4 Drawing Sheets

(51) Int. Cl.
H01H 47/22 (2006.01)
H02M 1/12 (2006.01)
H02M 7/04 (2006.01)
H02H 3/08 (2006.01)

(52) U.S. Cl.
CPC ............... *H02M 1/12* (2013.01); *H02M 7/04* (2013.01); *H02H 3/08* (2013.01)

(56) References Cited

FOREIGN PATENT DOCUMENTS

| | | | |
|---|---|---|---|
| CN | 102163518 | A | 8/2011 |
| CN | 102315043 | A | 1/2012 |
| CN | 102420078 | A | 4/2012 |
| CN | 102709118 | A | 10/2012 |
| CN | 103021735 | A | 4/2013 |
| CN | 103795315 | A | 5/2014 |
| EP | 2528079 | A2 | 11/2012 |
| JP | 2009/289690 | A | 12/2009 |
| WO | 86/01332 | A1 | 2/1986 |
| WO | 02/33719 | A1 | 4/2002 |

OTHER PUBLICATIONS

Office Action issued in corresponding European Application No. 15827157.7 dated Oct. 22, 2018 (12 pages).
International Search Report issued in PCT/CN2015/084895 dated Nov. 6, 2015 (2 pages).
Written Opinion of the International Searching Authority issued in PCT/CN2015/084895 dated Nov. 6, 2015 (3 pages).
Office Action issued in Chinese Application No. 201410370008.7; dated Feb. 3, 2017 (9 pages).

* cited by examiner

CONTROLLER AND CONTROL METHOD FOR ALTERNATING CURRENT CONTACTOR

BACKGROUND OF THE INVENTION

1. Field of the Invention

The invention relates to the technical field of low-voltage electric apparatus, more particularly, relates to a control technology of an alternating-current contactor.

2. The Related Art

Most of the electronic control technologies of an alternating current contactor use a control circuit built by a single-chip microcomputer or discrete components as a core, and adopts a PWM (pulse-width modulation) control mode to drive an electromagnet of the alternating current contactor to achieve reliable attraction, holding or releasing. The overall technical parameters shall meet the requirements provided in Standard GB14048.4, and realizes an energy-saving purpose.

The Chinese patent application with the application number CN201210196762.4, the publication number CN102709118A, and entitled "An energy-saving device of an alternating current contactor" discloses an energy-saving device of an alternating current contactor, comprising a peripheral circuit connected with the alternating current contactor and a signal processor connected with the peripheral circuit. The signal processor comprises a comparison circuit, a zero-crossing detection circuit, a pulse width modulation circuit, a selection circuit, a low-voltage detection circuit and a signal synthesis circuit. The energy-saving device disclosed by CN102709118A can only perform adjustable control of the PWM pulse width of small current during a holding stage of the electromagnet under different control voltages. However, during an attraction stage, the PWM pulse width is not adjustable. An attraction action of the electromagnet is driven by a plurality of fixed power frequency pulses, the amplitude and the dynamic characteristics of the attraction current cannot be controlled. Therefore, an attraction characteristic of the contactor is considerably influenced. This energy-saving device is not suitable for the applications which require frequent operations. A service life of the contactor is not good, while energy conservation is not facilitated. In addition, the PWM frequency of the small current for the holding stage is fixed to be a power frequency signal. Though a holding current can be kept as a constant current at a time level of 20 ms, the dynamic variation range of the small current within 20 ms is large, and the working frequency band belongs to a human ear receivable range and cannot further reduce the running noise of the contactor, the service life of the contactor is also influenced. Moreover, an automatic adjustment of the wide range of the control voltage cannot be realized. Therefore, the device cannot be applied to applications with large control voltage fluctuation. Meanwhile, energy-saving devices and coils with different parameters are required to be configured in order to meet the requirements of different control voltages. Thus the product model is increased, the management cost and the warehouse storage goods cost are correspondingly increased.

The Chinese patent application with the application number CN201210530495.X, the publication number CN103021735A, and entitled "alternating current contactor intelligent control module with high-speed pulse width modulation function" discloses an alternating current contactor intelligent control module with a high-speed pulse width modulation function, comprising an AC/DC power supply supplying power for an alternating-current contactor coil through a rectifying and filtering circuit and a power electronic switch. The alternating current contactor intelligent control module further comprises a voltage sampling circuit, a single-chip microcomputer control system, a two-way DA conversion circuit, a sawtooth wave generation circuit, a square wave clock signal, a high-speed pulse width modulator, a bootstrap circuit, a compensation circuit, a switching point detection circuit, a hall current sensor, a follow current circuit, a low voltage holding loop and a constant voltage/constant current automatic switching circuit. An attraction stage and a holding stage of the electromagnet disclosed by CN103021735A adopt two completely different control strategies. During attraction, a current feedback loop detects a coil current through a hall current detector under a PWM control mode, the single-chip microcomputer controls an exciting current of an adjusting coil according to the current feedback signal. When the attraction stage is completed, it is switched to a low-voltage holding loop through a trigger switching point detection circuit, supplying direct power supply to the electromagnet coil during the holding stage to drive the electromagnet. For the purpose of achieving normal operations of the contactor and an energy-saving mode of large attraction current and small holding current, two control loops (an attraction control loop and a holding control loop) are used in the whole control module, and the control mode further includes considerable hardware circuits such as a hall current sensor circuit and a trigger switching point detection circuit, and software expenditures. The cost is increased, more space is occupied. It is not suitable for the applications of small current contactors. The application range of this module is limited. However, for a large current contactor, due to the fact that more energy is required for the holding stage of the coils, a large capacity for sufficient power output is required so that a low-voltage holding circuit can provide sufficient energy to maintain the contact at a holding state, which may further increase the cost.

In addition, according to the existing solutions, a follow current circuit is provided in an electromagnet coil circuit. For a large current contactor, the presence of the follow current circuit will cause a slow change of the coil current because of a large inductance of the coil, which will lengthen a releasing process of the contactor and considerably influence a releasing performance of the contactor.

SUMMARY

The present invention discloses a controller and a control method for an alternating current contactor.

According to an embodiment of the present invention, a controller for an alternating current contactor is disclosed. The controller comprises:

a filtering and rectification circuit being connected to external alternating current, the filtering and rectification circuit filtering and rectifying the external alternating current;

an electromagnet component driven by an output of the filtering and rectification circuit, the electromagnet component performing actions of attraction, holding or releasing;

a power transistor circuit being connected to the electromagnet component;

a microcontroller being connected to the power transistor circuit, the microcontroller controlling on or off of the power transistor circuit so as to control the electromagnet component to perform the actions of attraction, holding or releasing;

wherein the controller further comprises:

a voltage control loop providing a voltage feedback signal to the microcontroller, the microcontroller generating a control signal according to the voltage feedback signal and outputting the control signal to the power transistor circuit, wherein the control signal is a PWM control signal having different duty cycles during the attraction and holding of the electromagnet component, the PWM control signal having different duty cycles makes the current not exceed a predetermined current threshold during the attraction and holding of the electromagnet component;

a current control loop providing a current feedback signal to the microcontroller, the microcontroller turning off the power transistor circuit upon detecting an overcurrent exceeding the current threshold.

According to an embodiment, the controller further comprises a switching circuit adjusting the current threshold according to different stages, wherein during the attraction of the electromagnet component, the switching circuit is provided with a first current threshold;

during the holding of the electromagnet component, the switching circuit is provided with a second current threshold;

the first current threshold is larger than the second current threshold.

According to an embodiment, the controller further comprises a PLC control module, wherein the PLC control module outputs a PLC control signal to the microcontroller when enabled, the microcontroller controls the power transistor circuit according to the PLC control signal so as to control the electromagnet component to perform actions of attraction, holding or releasing.

According to an embodiment, the electromagnet component comprises an electromagnet coil, a follow current circuit and a demagnetization circuit;

the follow current circuit is connected to the electromagnet coil, the follow current circuit works during attraction and holding of the electromagnetic coil to maintain the current in the electromagnet coil;

the demagnetization circuit is connected to the electromagnet coil and works during releasing of the electromagnet coil, the demagnetization circuit raises a voltage on two ends of the electromagnet coil utilizing a characteristic that a current at two ends of an electromagnet coil cannot be changed suddenly, so that energy of the electromagnet coil is dissipated rapidly.

According to an embodiment, the controller for an alternating current contactor comprises:

a filtering module, the external alternating current being connected to an input end of the filtering module;

a rectification module, an input end of the rectification module being connected to an output end of the filtering module;

an electromagnet coil, a follow current circuit and a demagnetization circuit, a first end of the electromagnet coil being connected to an output end of the rectification module, a second end of the electromagnet coil being connected to input ends of the follow current circuit and the demagnetization circuit, output ends of the follow current circuit and the demagnetization circuit being connected to the first end of the electromagnet coil;

a power MOS transistor and a MOS transistor driver, a source of the power MOS transistor being connected to the second end of the electromagnet coil, an output end of the MOS transistor driver being connected to a gate of the power MOS transistor;

a switching circuit, an input end of the switching circuit being connected to a drain of the power MOS transistor, an output end of the switching circuit being connected to the rectification module;

a voltage detector, an input end of the voltage detector being connected to the output end of the rectification module, an output end of the voltage detector outputting the voltage feedback signal;

a current detector, an input end of the current detector being connected to the drain of the power MOS transistor, an output end of the current detector outputting the current feedback signal;

a PLC control module, an input end of the PLC control module receiving a logical control signal, an output end of the PLC control module outputting the PLC control signal;

a microcontroller, the microcontroller receiving the voltage feedback signal from the voltage detector, the current feedback signal from the current detector and the PLC control signal from the PLC control module, the microcontroller outputting control signals to the demagnetization circuit, the MOS transistor driver and the switching circuit;

a power supply module, an input end of the power supply module being connected to the output end of the rectification module, the power supply module supplying direct current to the demagnetization circuit, the MOS transistor driver, the current detector, the voltage detector, the microcontroller and the PLC control module.

According to an embodiment, the input end of the filtering module includes two input terminals, the external alternating current is inputted into the filtering module through the two input terminals.

According to an embodiment, the power supply module outputs direct current power supplies with different voltages, wherein, the power supply module provides a 15V DC power supply for the demagnetization circuit; the power supply module provides a 12V DC power supply for the MOS transistor driver; the power supply module provides 5V DC power supplies fir the current detector, the voltage detector, the microcontroller and the PLC control module.

According to an embodiment, the PLC control module includes an AND gate, one input end of the AND gate is an enable end, the other input end of the AND gate is a control end, the control end receives an external control signal through an isolation circuit;

when the enable end is enabled, the control signal received by the control end is inputted into the AND gate, the AND gate computes the signal on the enable end and the signal on the control end and outputs a result on the output end of the AND gate, the output end of the AND gate acts as the output end of the PLC control module for outputting the PLC control signal.

According to an embodiment, a first input pin of the microcontroller is connected to the output end of the voltage detector, the first input pin receives the voltage feedback signal; a second input pin of the microcontroller is connected to the output end of the current detector, the second input pin receives the current feedback signal; a third input pin of the microcontroller is connected to the output end of the PLC control module, the third input pin receives the PLC control module; a first output pin of the microcontroller is connected to a control end of the demagnetization circuit, the first output pin outputs a demagnetization control signal; a second output pin of the microcontroller is connected to a control end of the MOS transistor driver, the second output pin outputs a MOS transistor driving signal; a third output pin of the microcontroller is connected to a control end of the switching circuit, the third output pin outputs a switching control signal.

According to an embodiment of the present invention, a control method for an alternating current contactor is provided, the method comprises:

filtering and rectifying an external alternating current, and driving an electromagnet component by an filtered and rectified output;

controlling on or off of a power transistor circuit by a microcontroller, the on or off of the power transistor circuit making the electromagnet component perform the actions of attraction, holding or releasing;

sampling a voltage feedback signal, the microcontroller generating a control signal according to the voltage feedback signal and controlling the power transistor circuit with the control signal, so that the electromagnet component performs the actions of attraction, holding or releasing, wherein the control signal is a PWM control signal having different duty cycles during the attraction and holding of the electromagnet component, the PWM control signal having different duty cycles makes the current not exceed a predetermined current threshold during the attraction and holding of the electromagnet component;

sampling a current feedback signal, the microcontroller turning off the power transistor circuit upon detecting an overcurrent exceeding the current threshold; providing a switching circuit for adjusting the current threshold according to different stages, wherein during the attraction of the electromagnet component, the switching circuit is provided with a first current threshold, and during the holding of the electromagnet component, the switching circuit is provided with a second current threshold, the first current threshold is larger than the second current threshold;

enabling a PLC control module, the PLC outputting a PLC control signal to the microcontroller when enabled, the microcontroller controlling the power transistor circuit according to the PLC control signal so as to control the electromagnet component to perform actions of attraction, holding or releasing.

The controller and the control method for an alternating current contactor of the present invention adopts a self-adaptive voltage-current dual loop control and provides a switchable PLC control mode. So that in a wide voltage range, a contactor is able to reliably attract during attraction, work with a basically constant current during holding, and rapidly break during releasing. The controller is small in size, low in cost and simple in switching between attraction and holding, and low in power consumption. The controller and the control method are applicable to contactors of all current-level.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

Figure 1:
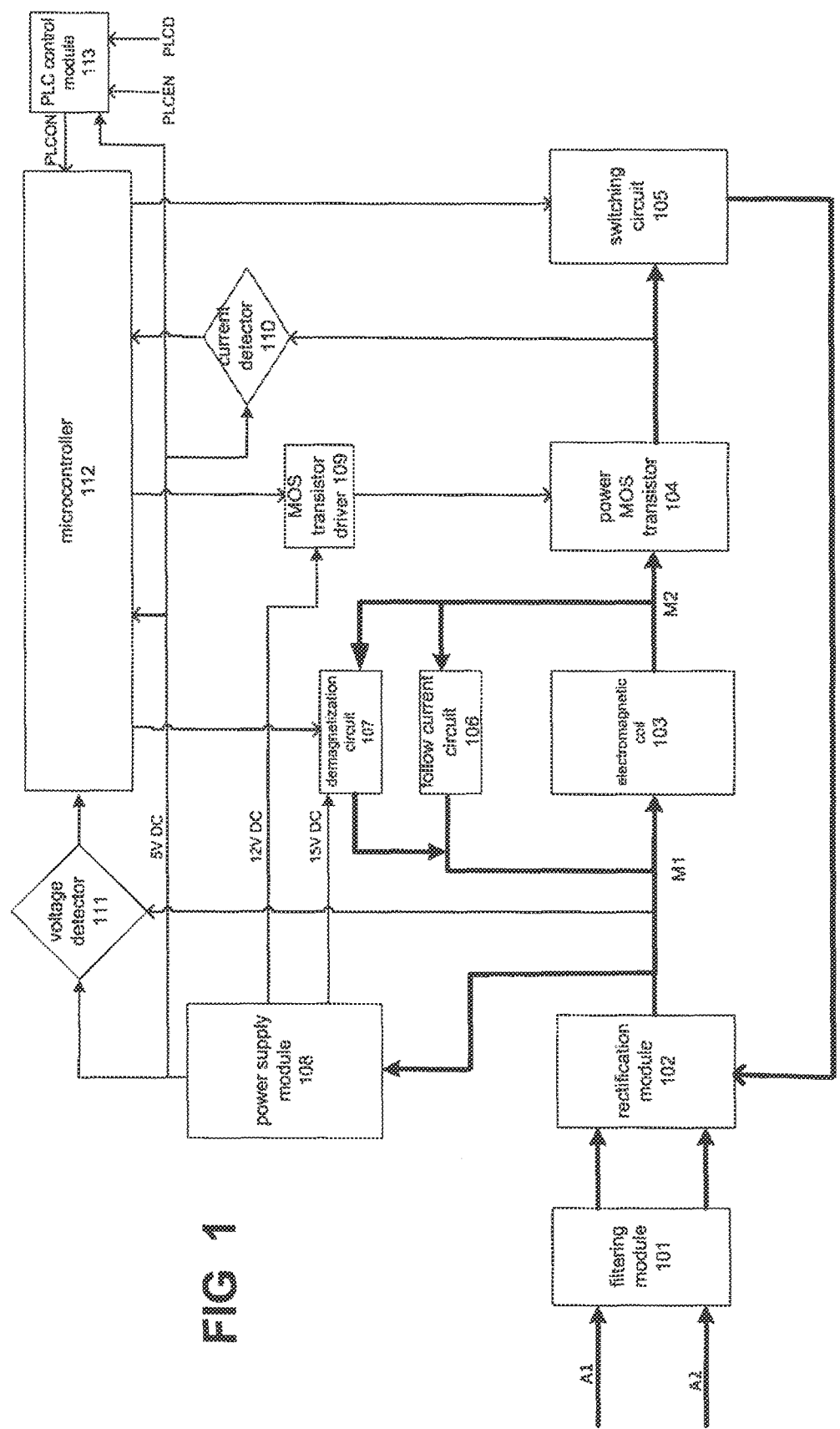
FIG. 1 illustrates a circuit schematic diagram of a controller for an alternating current contactor according to an embodiment of the present invention.

The present invention discloses a controller for an alternating current contactor. The controller comprises a filtering and rectification circuit, an electromagnet component, a power transistor circuit and a microcontroller. The filtering and rectification circuit is connected to external alternating current, filters and rectifies the external alternating current. The electromagnet component is driven by an output of the filtering and rectification circuit, performs actions of attraction, holding or releasing. The power transistor circuit is connected to the electromagnet component. The microcontroller is connected to the power transistor circuit. The microcontroller outputs a control signal to the power transistor circuit, the power transistor switches on or off according to the control signal so as to control the electromagnet component to perform the actions of attraction, holding or releasing.

A control mode of the controller is as follows: a voltage feedback signal is obtained through a voltage control loop, a current feedback signal is obtained through a current control loop. The voltage control loop provides the voltage feedback signal to the microcontroller, the microcontroller generates a control signal according to the voltage feedback signal and outputs the control signal to the power transistor circuit. The control signal is a PWM control signal having different duty cycles during the attraction and holding of the electromagnet component. The PWM control signal having different duty cycles makes the current not exceed a predetermined current threshold during the attraction and holding of the electromagnet component. The current control loop provides the current feedback signal to the microcontroller, the microcontroller turns off the power transistor circuit upon detecting an overcurrent exceeding the current threshold.

A PLC control module is provided. The PLC control module is connected to the microcontroller. The PLC control module outputs a PLC control signal to the microcontroller when enabled, the microcontroller controls the power transistor circuit according to the PLC control signal so as to control the electromagnet component to perform actions of attraction, holding or releasing. The PLC control module provides an extended control mode, adopting a weak electric signal to directly control attraction, holding or releasing of an electromagnet through a microcontroller. As an extension, the control mode of the PLC control module is a supplement for an external power supply control mode (a strong power control).

In order to adapt different peak currents during attraction and holding of the electromagnetic component, a switching circuit is provided. The switching circuit adjusts the current threshold according to different stages: during the attraction of the electromagnet component, the switching circuit is provided with a first current threshold. During the holding of the electromagnet component, the switching circuit is provided with a second current threshold. The first current threshold is larger than the second current threshold.

In order to achieve a reliable attraction during attraction, a stable current during holding and a rapid release during releasing, the electromagnet component of the controller of the present invention is provided with an electromagnet coil, a follow current circuit and a demagnetization circuit. The follow current circuit is connected to the electromagnet coil, the follow current circuit works during attraction and holding of the electromagnetic coil to maintain the current in the electromagnet coil. The demagnetization circuit is connected to the electromagnet coil and works during releasing of the electromagnet coil, the demagnetization circuit raises a voltage on two ends of the electromagnet coil utilizing a characteristic that a current at two ends of an electromagnet coil cannot be changed suddenly, so that energy of the electromagnet coil is dissipated rapidly.

Referring to FIG. 1 to FIG. 4, which illustrate a circuit schematic diagram of a controller for an alternating current contactor according to an embodiment of the present invention, and circuit diagrams of some components and circuits therein.

Referring to FIG. 1, FIG. 1 illustrates a circuit schematic diagram of a controller for an alternating current contactor according to an embodiment of the present invention. According to FIG. 1, a thicker line represents a power loop (a strong circuit loop), while a thinner line represents a control loop (a weak current loop). The controller comprises:

A filtering module 101, the external alternating current is connected to an input end of the filtering module 101. According to the embodiment shown in FIG. 1, the input end of the filtering module 101 includes two input terminals A1, A2, the external alternating current is inputted into the filtering module 101 through the two input terminals A1, A2.

A rectification module 102, an input end of the rectification module 102 is connected to an output end of the filtering module 101. The filtering module 101 and the rectification module 102 filter and rectify the external alternating current and generate a pulse direct current. The rectification module 102 outputs the pulse direct current to an electromagnet coil 103, a power supply module 108 and a voltage detector 111. The rectification module 102 is also connected to a switching circuit 105 and receives a feedback signal from the switching circuit 105.

The electromagnet coil 103, the follow current circuit 106 and the demagnetization circuit 107 form the electromagnet component. A first end 111 of the electromagnet coil 103 is connected to an output end of the rectification module 102. A second end M2 of the electromagnet coil 103 is connected to input ends of the follow current circuit 106 and the demagnetization circuit 107. Output ends of the follow current circuit 106 and the demagnetization circuit 107 are connected to the first end M1 of the electromagnet coil 103. The follow current circuit 106 and the demagnetization circuit 107 are generally parallel-connected. The follow current circuit 106 and the demagnetization circuit 107 operate alternately at different stages, which will be described in detail below.

A power MOS transistor 104 and a MOS transistor driver 109, a source S of the power MOS transistor 104 is connected to the second end M2 of the electromagnet coil 103. An output end of the MOS transistor driver 109 is connected to a gate G of the power MOS transistor 104. A drain of the power MOS transistor 104 is connected to the switching circuit 105. A control end of the MOS transistor driver 109 is controlled by the microcontroller 112. The microcontroller 112 controls on or off of the power MOS transistor 104 through the MOS transistor driver 109.

A switching circuit 105, an input end of the switching circuit 105 is connected to a drain D of the power MOS transistor 104, an output end of the switching circuit 105 is connected to the rectification module 102. A control end of the switching circuit 105 is controlled by the microcontroller 112.

A voltage detector 111, an input end of the voltage detector 111 is connected to the output end of the rectification module 102, an output end of the voltage detector 111 outputs the voltage feedback signal to the microcontroller 112.

A current detector 110, an input end of the current detector 110 is connected to the drain D of the power MOS transistor 104, an output end of the current detector 110 outputs the current feedback signal to the microcontroller 112.

Figure 2:
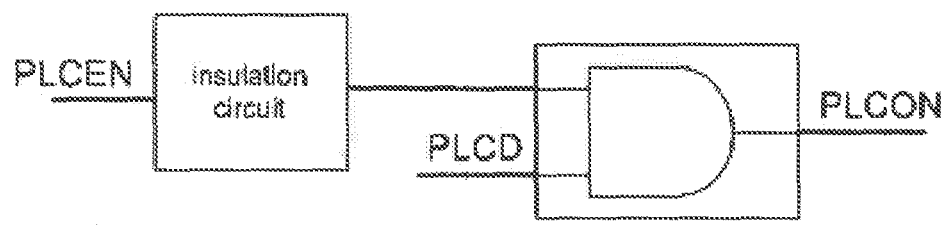
FIG. 2 illustrates a structural diagram of a PLC control module in the controller for an alternating current contactor according to an embodiment of the present invention.

A PLC control module 113, an input end of the PLC control module 113 receives a logical control signal, an output end PLCON of the PLC control module outputs the PLC control signal. The PLC control module 113 provides an extended control mode, which may directly control the microcontroller 112 through the PLC control signal. Referring to FIG. 2, FIG. 2 illustrates a structural diagram of a PLC control module in the controller for an alternating current contactor according to an embodiment of the present invention. The PLC control module 113 includes an AND gate, one input end of the AND gate is an enable end PLCEN, the other input end of the AND gate is a control end PLCD, the control end PLCD receives an external control signal through an isolation circuit. According to an embodiment, the enable end PLCEN may be connected to a single-bit dial switch, the single-bit dial switch achieves inputting of an enable signal. The isolation circuit may be realized by an optocoupler isolation circuit. When PLCEN is enabled, the control signal of the control end PLCD is able to be inputted into the AND gate through the optocoupler isolation circuit. The signal inputted by the enable end PLCEN and the control signal inputted by the control end PLCD are computed in the AND gate and generate the PLC control signal. The PLC control signal is outputted to the microcontroller 112 through the output end PLCON.

A microcontroller 112, the microcontroller 112 receives the voltage feedback signal from the voltage detector 111, the current feedback signal from the current detector 110 and the PLC control signal from the PLC control module 113. The microcontroller 112 outputs control signals to the demagnetization circuit 107, the MOS transistor driver 109 and the switching circuit 105. According to the embodiments shown in FIG. 1, a first input pin PI1 of the microcontroller 112 is connected to the output end of the voltage detector 111, the first input pin PI1 receives the voltage feedback signal. A second input pin PI2 of the microcontroller 112 is connected to the output end of the current detector 110, the second input pin PI2 receives the current feedback signal. A third input pin PI3 of the microcontroller 112 is connected to the output end PLCON of the PLC control module 113, the third input pin PI3 receives the PLC control module. A first output pin PO1 of the microcontroller 112 is connected to a control end of the demagnetization circuit 107, the first output pin PO1 outputs a demagnetization control signal. A second output pin PO2 of the microcontroller 112 is connected to a control end of the MOS transistor driver 109, the second output pin PO2 outputs a MOS transistor driving signal. A third output pin PO3 of the microcontroller 112 is connected to a control end of the switching circuit 105, the third output pin PO3 outputs a switching control signal.

A power supply module 108, an input end of the power supply module 108 is connected to the output end of the rectification module 102. The power supply module 108 supplies direct current to the demagnetization circuit 107, the MOS transistor driver 109, the current detector 110, the voltage detector 111, the microcontroller 112 and the PLC control module 113. According to the embodiment shown in FIG. 1, the power supply module 108 outputs direct current (DC) power supplies with different voltages. Wherein, the power supply module 108 provides a 15V DC power supply for the demagnetization circuit 107. The power supply module 108 provides a 12V DC power supply for the MOS transistor driver 109. The power supply module 108 provides 5V DC power supplies for the current detector 110, the voltage detector 111, the microcontroller 112 and the PLC control module 113.

The frequency of the alternating current control voltage input by the external alternating current power supply is 50 Hz, and the alternating current control voltage is changed to be 100 Hz after being rectified by the rectification module 102. The voltage detector 111 processes the rectified voltage signal to obtain a voltage feedback signal, the voltage feedback signal is inputted to a voltage sampling port of the microcontroller 112, that is, the first input pin PI1. The microcontroller 112 sets a sampling period of 10 ms, and performs true effective value operation processing on the sampling points, so as to obtain an effective value of the control voltage. The effective value is used as a basis for controlling operation of the electromagnet component. The operation voltage of the contactor is 110~230V. According to the provisions of GB14048.4-2010, a contactor must be able to reliably attract under 85%~110% of the control voltage, and completely release under 20%~75% of the control voltage. Therefore, it is determined that an attraction voltage is 90~255V, a holding voltage is 80~255V and a releasing voltage is 80V. There is a hysteresis voltage of 10V between the releasing voltage and a minimal value of the attraction voltage. The hysteresis voltage works as a threshold voltage which ensures reliable attraction and releasing of the electromagnet and prevents the contactor from fusion caused by shaking of the electromagnet. The microcontroller 112 outputs a control signal to the power transistor circuit according to the voltage range of the feedback voltage. The electromagnet is controlled by the power transistor circuit to perform corresponding actions. If the feedback voltage is the attraction voltage, the electromagnet is controlled to perform an attraction action. If the feedback voltage is the holding voltage, the electromagnet is controlled to execute a holding action. And if the feedback voltage is the releasing voltage, the electromagnet is controlled to perform a releasing action.

As described above, the attraction voltage of the contactor is 90~255V and the holding voltage is 80~255V, which fall in a same range. During the attraction stage and the holding stage, the feedback voltage may be different. A PWM technology is applied to reliably control the electromagnet coil, so as to ensure that the contactor can reliably attract or hold under different control voltages. The microcontroller 112 controls the current during the attraction and holding stages by outputting PWM waveforms with different duty cycles to a MOS transistor driver and a power MOS transistor. PWM duty cycles for attraction or holding under different control voltages are stored in a FLASH or EEPROM of the microcontroller 112. When powered on, the microcontroller 112 reads the relevant PWM duty cycle from the FLASH or EEPROM. After sampling 2 cycles (20 ms) of the control voltage, the microcontroller 112 generates a set PWM waveform for controlling during the attraction stage according to the scale of the control voltage (wherein the control voltage is the voltage feedback signal outputted by the voltage detector 111). During this stage, the voltage detector 111 still continuously detects the control voltage so as to modify the PWM duty cycle in real time. Over several cycles (generally greater than 60 ms, and my be different according to different characteristics of contactors, the time shall ensure that the contactor can be reliably attracted), the attraction action shall be completed, at this time, the microcontroller 112 adjusts the PWM duty cycle to a range corresponding to the holding stage according to the control voltage collected at that time and continuously adjusts the PWM duty cycle. The control method that adjusts the duty cycle according to the control voltage (the voltage feedback signal) in real time during the attraction and holding stages may achieve an optimal cooperation of a attraction force and a counter force, which can reduce bouncing of the iron core and facilitate a dynamic control so as to prolong a service life of the contactor. When the control voltage (that is, the voltage feedback signal) is within the normal attraction and holding range, which means 80~255V, the microcontroller 112 continues to use the control voltage as a basis of control and outputs a PWM signal with a corresponding duty cycle. If the feedback voltage is lower than 80V, the contactor performs a releasing action. If the feedback voltage is higher than the upper limit of the attraction voltage, such as 255V, the circuit needs to be turned off in time to protect the elements because a fault may occur at the moment which will cause a over voltage.

During the operation of the contactor, the phenomenon of short circuit caused by overheating of the coil insulation damage often occurs. Without protection, a short-circuit induced over-current will result in damage of the coil and the control circuit. Moreover, installation of a coil with a wrong voltage class will also cause an over-current. Thus, the controller of the present invention is provided with a current detector 110. The current detector device 110 collects a current feedback signal and provides the current feedback signal to the microcontroller 112. The microcontroller 112 compares the current feedback signal collected by the current detector 110 with a current threshold value. When the current feedback signal is larger than the threshold value, it indicates that an over-current state occurs. At this time, the microcontroller 112 stops outputting the PWM signal to turn off the power transistor circuit.

Due to different working statuses of the electromagnet component during attraction and holding, the allowed currents of attraction and holding are different. A larger current is allowed during attraction while a smaller current is allowed during holding. Therefore, the microcontroller 112 should set different current thresholds for control for different stages.

Figure 3:
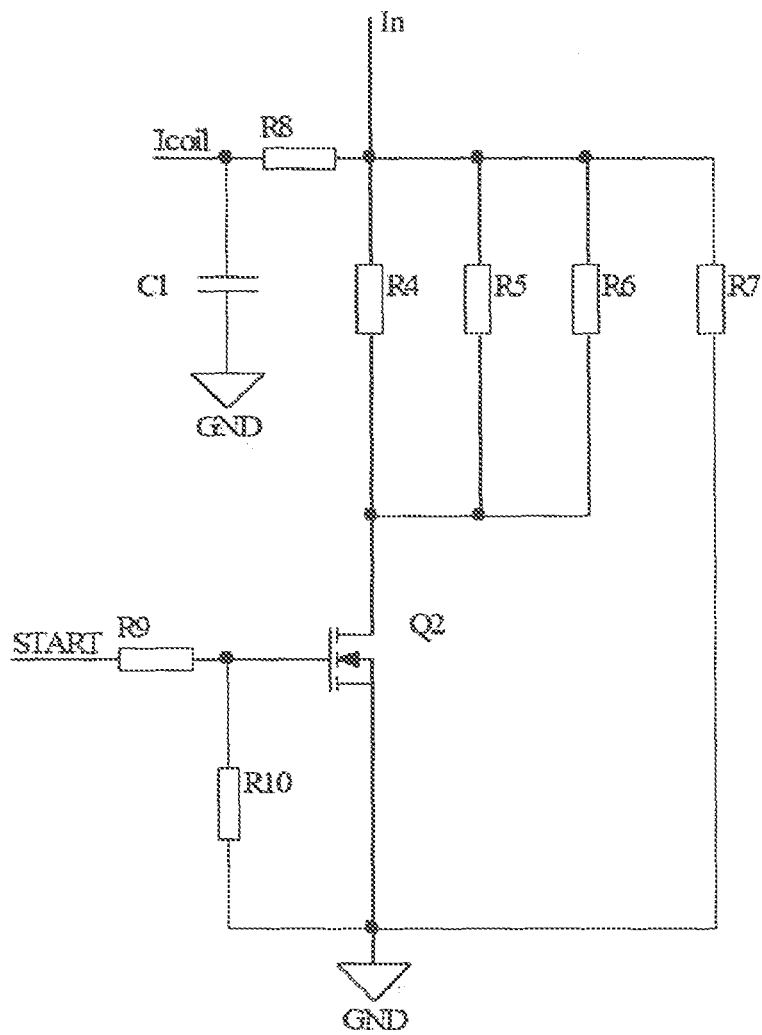
FIG. 3 illustrates a circuit diagram of a switching circuit in the controller for an alternating current contactor according to an embodiment of the present invention.

The switching circuit 105 is used to adjust the current thresholds at different stages. FIG. 3 illustrates a circuit diagram of a switching circuit in the controller for an alternating current contactor according to an embodiment of the present invention. As shown in FIG. 3, the switching circuit 105 includes resistors R4, R5, R6, R7, R8, R9 and R10, a capacitor C1, a MOS transistor Q2. The resistors R4, R5 and R6 are connected in parallel, the resistor R7 is connected in series with the MOS transistor Q2 and then connected in parallel with the resistors R4, R5 and R6. The resistors R9 and R10 serve as auxiliary resistors of the control end. The resistor R9 is the control end "START" of the switching circuit 105 and is connected to the microcontroller 112. The resistor R8 and the capacitor C1 serve as the auxiliary resistors and capacitors of the input ends and the output ends. The terminal "Icoil" shown in FIG. 3 is the output end of the switching circuit 105. The terminal "In" shown in FIG. 3 is the input end of the switching circuit 105 and is connected to the drain D of the power MOS transistor 104. During attraction of the contactor, the microcontroller 112 outputs a control signal to the control end "START". The control signal during attraction is a high level signal. When the power MOS transistor 104 is conducted, the MOS transistor Q2 is conducted and resistors R4, R5, R6 and R7 form a parallel connection. A voltage signal on the resistor network is outputted from the end "icoil" to the microcontroller 112 as a feedback signal. The microcontroller 112 sets a large current threshold value corresponding to the attraction stage according to the feedback signal. After attraction, the signal outputted to the end "START" by the microcontroller 112 is a low level signal. The MOS transistor Q2 is turned off, the voltage signal on the resistor R7 is outputted from the end "Icoil" to the microcontroller 112 as a feedback signal. The microcontroller 112 sets a lower current threshold value corresponding to the holding stage according to the feedback signal. The voltage signal on the resistor network and the voltage signal on R7 are different, the microcontroller 112 can achieve a segmented control according to the difference between the signals.

Figure 4:
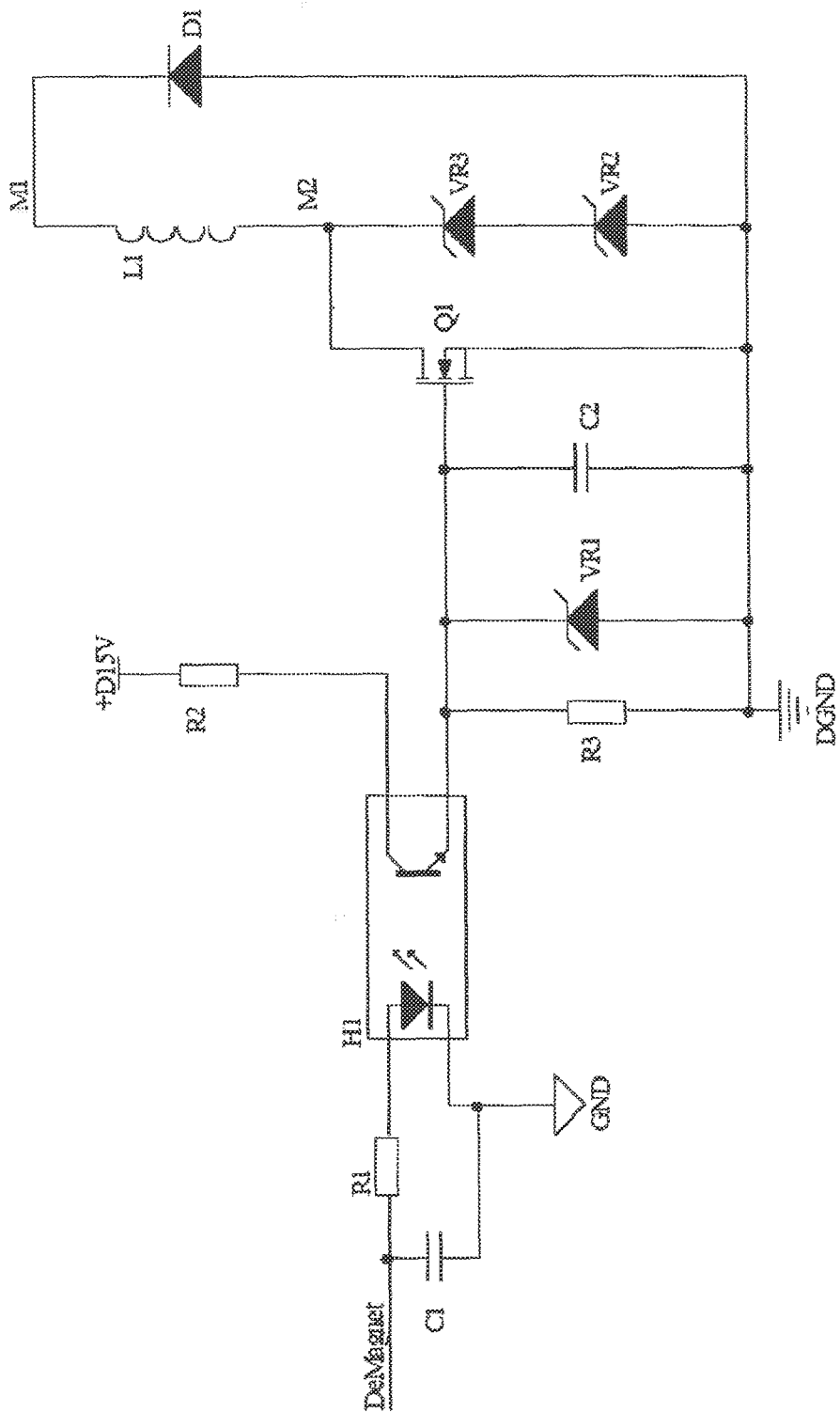
FIG. 4 illustrates a circuit diagram of a demagnetization circuit in the controller for an alternating current contactor according to an embodiment of the present invention.

In order to achieve rapid releasing of the electromagnet component, the controller of the present invention also includes a demagnetization circuit 107 in the electromagnet component. FIG. 4 illustrates a circuit diagram of a demagnetization circuit in the controller for an alternating current contactor according to an embodiment of the present invention. As shown in FIG. 4, the demagnetization circuit 107 is connected to both ends of electromagnet coil 103. In FIG. 4, the electromagnet coil 103 is represented by "L1", the two ends of the "L1" are respectively end "M1" and end "M2", The demagnetization circuit 107 includes voltage stabilizing transistors VR1, VR2 and VR3, a diode D1, a MOS transistor Q1, resistors R1, R2 and R3, and capacitors C2 and C3. The end "±D15V" is the input of a power supply and is connected to the power supply module. The end "DeMagnet" is a control end and is connected to the microcontroller 112. When the contactor is in the attraction or holding stage, the signal outputted from the microcontroller 112 to the "DeMagnet" end is a high level signal. When the power MOS transistor 104 is conducted, the MOS transistor Q1 is not conducted and a holding current flows through L1. When the power MOS transistor 104 is turned off, the MOS transistor Q1 is conducted and a follow current flows through L1 via the MOS transistor Q1 and the diode D1. When the contactor is in the releasing stage, the signal outputted from the microcontroller 112 to the "DeMagnet" end is a low level signal. The MOS transistor Q1 is turned off, and the power MOS transistor 104 is turned off at the same time, L1 releases energy through the voltage stabilizing transistors VR2 and VR3 rapidly, so that the purpose of quickly releasing the electromagnet is achieved.

The present invention further discloses a control method for an alternating current contactor, comprising:

Filtering and rectifying an external alternating current, and driving an electromagnet component by an filtered and rectified output;

Controlling on or off of a power transistor circuit by a microcontroller, the on or off of the power transistor circuit making the electromagnet component perform the actions of attraction, holding or releasing;

Sampling a voltage feedback signal, the microcontroller generating a control signal according to the voltage feedback signal and controlling the power transistor circuit with the control signal, so that the electromagnet component performs the actions of attraction, holding or releasing, wherein the control signal is a PWM control signal having different duty cycles during the attraction and holding of the electromagnet component, the PWM control signal having different duty cycles makes the current not exceed a predetermined current threshold during the attraction and holding of the electromagnet component;

Sampling a current feedback signal, the microcontroller turning off the power transistor circuit upon detecting an overcurrent exceeding the current threshold; providing a switching circuit for adjusting the current threshold according to different stages, wherein during the attraction of the electromagnet component, the switching circuit is provided with a first current threshold, and during the holding of the electromagnet component, the switching circuit is provided with a second current threshold, the first current threshold is larger than the second current threshold;

Enabling a PLC control module, the PLC control module outputting a PLC control signal to the microcontroller when enabled, the microcontroller controlling the power transistor circuit according to the PLC control signal so as to control the electromagnet component to perform actions of attraction, holding or releasing.

Figure 5:
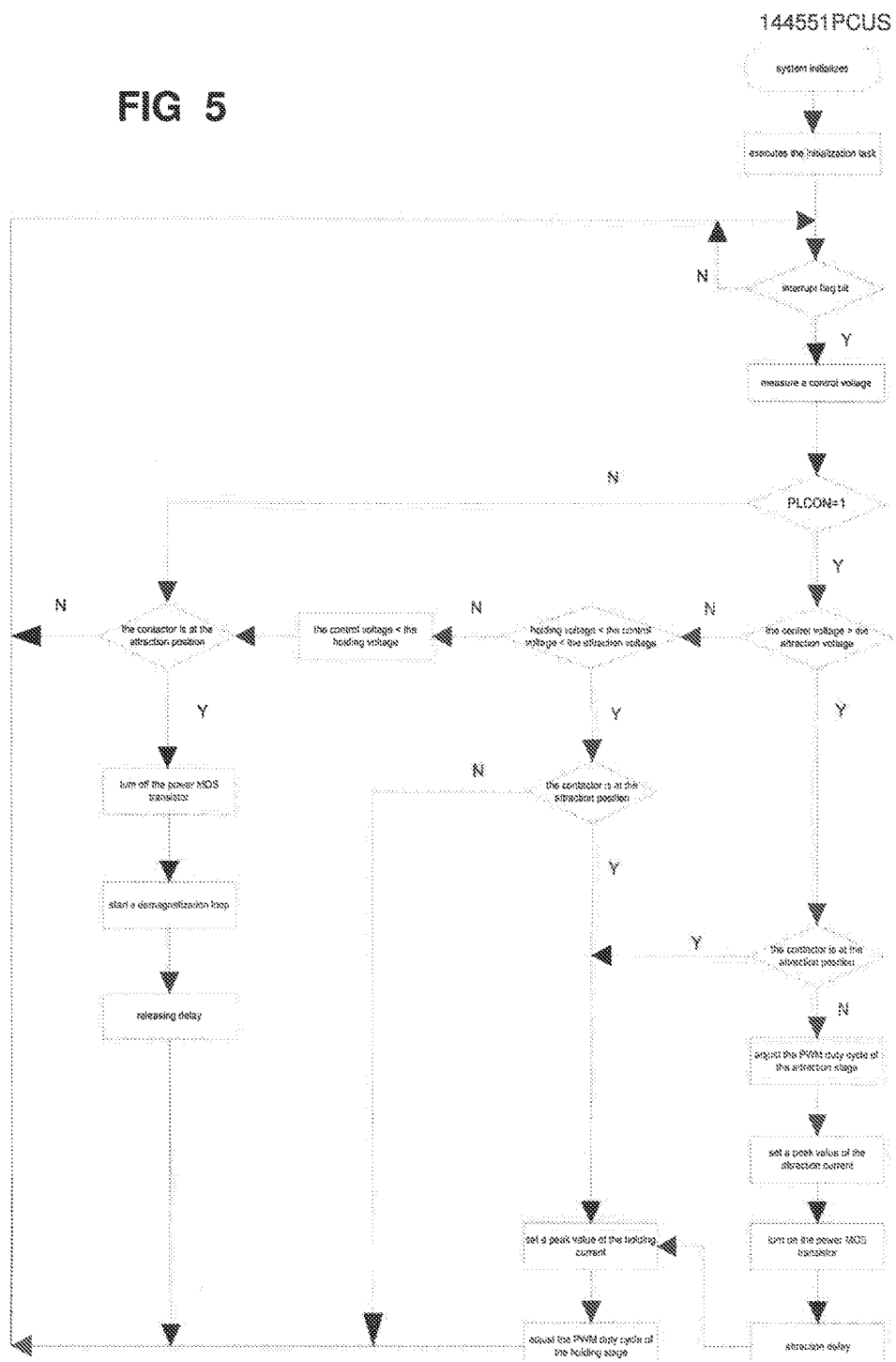
FIG. 5 illustrates a logic diagram a control method for an alternating current contactor according to an embodiment of the present invention.

FIG. 5 illustrates a logic diagram a control method for an alternating current contactor according to an embodiment of the present invention. As shown in FIG. 5, the control method for an alternating current contactor of the present invention as performed as follows:

The system initializes and executes the initialization task.

Detect whether an interrupt flag bit occurs and enter a control process when an interrupt flag bit occurs.

Measure a control voltage.

Detect whether a PLC control signal PLCON exists or not. If PLCON=1, it is considered that the PLC control signal is not present, and it is controlled by the control voltage. If PLCON=0, it is considered that the PLC control signal exists, and it is directly controlled by the PLC control signal.

When PLCON=1, it is determined whether the condition: the control voltage>the attraction voltage is met or not.

If the condition: the control voltage>the attraction voltage is met, then determine whether the contactor is at an attraction position or not. If the contactor is not at the attraction position, then adjust the PWM duty cycle of the attraction stage, set a peak value of the attraction current, turn on the power MOS transistor, execute an attraction action and initiate an attraction delay. The peak value of the current is adjusted to be a peak value of the holding current after the time delay is reached. If the contactor is at the attraction position, then peak value of the holding current is set directly. After setting the peak value of the holding current, adjust the PWM duty cycle of the holding stage. Then the operation is completed and return to the step of detecting the interrupt flag bit, and wait for the next interrupt flag bit.

If the condition: the control voltage>the attraction voltage is not met, then determine if the condition: the holding voltage<the control voltage<the attraction voltage is met or not.

If the condition: the holding voltage<the control voltage<the attraction voltage is met, then determine whether the contactor is at the attraction position or not. If the contactor is at the attraction position, then set the peak value of the holding current, adjust the PWM duty cycle of the holding stage. Then the operation is completed and return to the step of detecting the interrupt flag bit, and wait for the next interrupt flag bit. If the contactor is not at the attraction position, then the operation is directly completed and return to the step of detecting the interrupt flag bit, and wait for the next interrupt flag bit.

If the condition: the holding voltage<the control voltage<the attraction voltage is not met, then it is considered that the control voltage is smaller than the holding voltage (the control voltage<the holding voltage). Determine whether the contactor is at the attraction position or not. When the control voltage is smaller the holding voltage, or PLCON=0, a same control logic is entered. Determine whether the contactor is at the attraction position or not. If the contactor is not at the attraction position, then the operation is directly completed and return to the step of detecting the interrupt flag bit, and wait for the next interrupt flag bit. If the contactor is at the attraction position, then turn off the power MOS transistor and start a demagnetization loop to enable the contactor to release. A releasing delay is initiated and the operation is completed after the delay is reached, then return to the step of detecting the interrupt flag bit, and wait for the next interrupt flag bit.

The controller and the control method for an alternating current contactor of the present invention adopts a self-adaptive voltage-current dual loop control and provides a switchable PLC control mode. So that in a wide voltage range, a contactor is able to reliably attract during attraction, work with a basically constant current during holding, and rapidly break during releasing. The controller is small in size, low in cost and simple in switching between attraction and holding, and low in power consumption. The controller and the control method are applicable to contactors of all current-level.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A controller for an alternating current contactor, comprising:
   a filtering and rectification circuit connected to external alternating current, the filtering and rectification circuit is adapted to filter and rectify the external alternating current;
   an electromagnet component driven by an output of the filtering and rectification circuit, the electromagnet component is adapted to perform actions of attraction, holding or releasing;
   a power transistor circuit connected to the electromagnet component;
   a microcontroller connected to the power transistor circuit, the microcontroller is adapted to control on or off of the power transistor circuit so as to control the electromagnet component to perform the actions of attraction, holding or releasing;
   wherein the controller further comprises:
   a voltage control loop adapted to provide a voltage feedback signal to the microcontroller, the microcontroller is adapted to generate a control signal according to the voltage feedback signal and output the control signal to the power transistor circuit, wherein the control signal is a PWM control signal having different duty cycles during the attraction and holding of the electromagnet component, the PWM control signal having different duty cycles makes the current not exceed a predetermined current threshold during the attraction and holding of the electromagnet component;
   a current control loop adapted to provide a current feedback signal to the microcontroller, the microcontroller is adapted to turn off the power transistor circuit upon detecting an overcurrent exceeding the current threshold.

2. The controller for an alternating current contactor according to claim 1, further comprising a switching circuit adapted to adjust the current threshold according to different stages, wherein
   during the attraction of the electromagnet component, the switching circuit is provided with a first current threshold;
   during the holding of the electromagnet component, the switching circuit is provided with a second current threshold;
   wherein the first current threshold is larger than the second current threshold.

3. The controller for an alternating current contactor according to claim 1, further comprising a PLC control module, wherein the PLC control module is adapted to output a PLC control signal to the microcontroller when enabled, the microcontroller is adapted to control the power transistor circuit according to the PLC control signal so as to control the electromagnet component to perform actions of attraction, holding or releasing.

4. The controller for an alternating current contactor according to claim 1, wherein the electromagnet component comprises an electromagnet coil, a follow current circuit and a demagnetization circuit;
   the follow current circuit is connected to the electromagnet coil, the follow current circuit is adapted to work during attraction and holding of the electromagnetic coil to maintain the current in the electromagnet coil;
   the demagnetization circuit is connected to the electromagnet coil and is adapted to work during releasing of the electromagnet coil, the demagnetization circuit is adapted to raise a voltage on two ends of the electromagnet coil utilizing a characteristic that a current at two ends of an electromagnet coil cannot be changed suddenly, so that energy of the electromagnet coil is dissipated rapidly.

5. The controller for an alternating current contactor according to claim 1, comprising:
   a filtering module, the external alternating current being connected to an input end of the filtering module;
   a rectification module, an input end of the rectification module being connected to an output end of the filtering module;
   an electromagnet coil, a follow current circuit and a demagnetization circuit, a first end of the electromagnet coil being connected to an output end of the rectification module a second end of the electromagnet coil being connected to input ends of the follow current circuit and the demagnetization circuit, output ends of the follow current circuit and the demagnetization circuit being connected to the first end of the electromagnet coil;
   a power MOS transistor and a MOS transistor driver, a source of the power MOS transistor being connected to the second end of the electromagnet coil, an output end of the MOS transistor driver being connected to a gate of the power MOS transistor;
   a switching circuit, an input end of the switching circuit being connected to a drain of the power MOS transistor, an output end of the switching circuit being connected to the rectification module;

a voltage detector, an input end of the voltage detector being connected to the output end of the rectification module, an output end of the voltage detector outputting the voltage feedback signal;

a current detector, an input end of the current detector being connected to the drain of the power MOS transistor, an output end of the current detector outputting the current feedback signal;

a PLC control module, an input end of the PLC control module receiving a logical control signal, an output end of the PLC control module outputting the PLC control signal;

a microcontroller, the microcontroller receiving the voltage feedback signal from the voltage detector, the current feedback signal from the current detector and the PLC control signal from the PLC control module, the microcontroller outputting control signals to the demagnetization circuit, the MOS transistor driver and the switching circuit;

a power supply module, an input end of the power supply module being connected to the output end of the rectification module, the power supply module supplying direct current to the demagnetization circuit, the MOS transistor driver, the current detector, the voltage detector, the microcontroller and the PLC control module.

6. The controller for an alternating current contactor according to claim 5, wherein the input end of the filtering module includes two input terminals, the external alternating current is inputted into the filtering module through the two input terminals.

7. The controller for an alternating current contactor according to claim 5, wherein the power supply module is adapted to output direct current (DC) power supplies with different voltages, wherein,
the power supply module is adapted to provide a 15V DC power supply for the demagnetization circuit;
the power supply module is adapted to provide a 12V DC power supply for the MOS transistor driver;
the power supply module is adapted to provide 5V DC power supplies for the current detector, the voltage detector, the microcontroller and the PLC control module.

8. The controller for an alternating current contactor according to claim 5, wherein the PLC control module includes an AND gate, one input end of the AND gate is an enable end, the other input end of the AND gate is a control end, the control end is adapted to receive an external control signal through an isolation circuit;
when the enable end is enabled, the control signal received by the control end is inputted into the AND gate, the AND gate is adapted to compute the signal on the enable end and the signal on the control end and output a result on the output end of the AND gate, the output end of the AND gate is adapted to act as the output end of the PLC control module for outputting the PLC control signal.

9. The controller for an alternating current contactor according to claim 5, wherein a first input pin of the microcontroller is connected to the output end of the voltage detector, the first input pin is adapted to receive the voltage feedback signal;

a second input pin of the microcontroller is connected to the output end of the current detector, the second input pin is adapted to receive the current feedback signal;

a third input pin of the microcontroller is connected to the output end of the PLC control module, the third input pin is adapted to receive the PLC control module;

a first output pin of the microcontroller is connected to a control end of the demagnetization circuit, the first output pin is adapted to output a demagnetization control signal;

a second output pin of the microcontroller is connected to a control end of the MOS transistor driver (109), the second output pin is adapted to output a MOS transistor driving signal;

a third output pin of the microcontroller is connected to a control end of the switching circuit, the third output pin is adapted to output a switching control signal.

10. A control method for an alternating current contactor, comprising:
filtering and rectifying an external alternating current, and driving an electromagnet component by an filtered and rectified output;
controlling on or off of a power transistor circuit by a microcontroller, the on or off of the power transistor circuit making the electromagnet component perform the actions of attraction, holding or releasing;
sampling a voltage feedback signal, the microcontroller generating a control signal according to the voltage feedback signal and controlling the power transistor circuit with the control signal, so that the electromagnet component performs the actions of attraction, holding or releasing, wherein the control signal is a PWM control signal having different duty cycles during the attraction and holding of the electromagnet component, the PWM control signal having different duty cycles makes the current do not exceed a predetermined current threshold during the attraction and holding of the electromagnet component;
sampling a current feedback signal, the microcontroller turning off the power transistor circuit upon detecting an overcurrent exceeding the current threshold; providing a switching circuit for adjusting the current threshold according to different stages, wherein during the attraction of the electromagnet component, the switching circuit is provided with a first current threshold, and during the holding of the electromagnet component, the switching circuit is provided with a second current threshold, the first current threshold is larger than the second current threshold;
enabling a PLC control module, the PLC outputting a PLC control signal to the microcontroller when enabled, the microcontroller controlling the power transistor circuit according to the PLC control signal so as to control the electromagnet component to perform actions of attraction, holding or releasing.

* * * * *